United States Patent [19]

Maiocchi

[11] 3,818,964

[45] June 25, 1974

[54] TREAD PROFILE OF A RADIAL TIRE FOR MOTOR VEHICLES

[75] Inventor: Luigi Maiocchi, Milan, Italy

[73] Assignee: Industrie Pirelli S.p.A., Milan, Italy

[22] Filed: Nov. 9, 1972

[21] Appl. No.: 304,984

[30] Foreign Application Priority Data
Nov. 12, 1971 Italy.................................. 31004/71

[52] U.S. Cl............................................. 152/209 R
[51] Int. Cl. ................................................ B60c 9/18
[58] Field of Search ........................ 152/209 R, 361

[56] References Cited
UNITED STATES PATENTS

| | | | |
|---|---|---|---|
| 3,482,616 | 12/1969 | French............................ | 152/209 R |
| 3,559,712 | 2/1971 | Verdier............................ | 152/209 R |
| 3,581,794 | 6/1971 | Heuze............................. | 152/361 R |
| 3,667,527 | 6/1972 | Magistrimi and Maiocchi | 152/361 R |

FOREIGN PATENTS OR APPLICATIONS 1,414,773   12/1963   France............................ 152/209 R Primary Examiner—Robert J. Spar
Assistant Examiner—Kenneth Noland
Attorney, Agent, or Firm—Stevens, Davis, Miller & Mosher

[57] ABSTRACT

A radial pneumatic tire having a tread disposed on a carcass between its sidewalls and having an annular reinforcing member or breaker embedded between the tread and carcass is provided with a shoulder between the tread and each sidewall having a conical surface to facilitate steering a vehicle equipped with radial tires from one lane to a second lane which is on a level higher than the first one.

6 Claims, 10 Drawing Figures

TREAD PROFILE OF A RADIAL TIRE FOR MOTOR VEHICLES

This invention relates to a pneumatic tire for vehicles and more particularly to an improved radial tire.

The performance of radial tires on surfaces which vary abruptly in height is not entirely satisfactory because of the tendency of such tires to change their direction of travel when a ridge or step in the roadway is encountered.

As it is known, vehicles, in particular when they are equipped with radial tires, find it difficult to move between two surfaces of a roadway which are on different levels, in particular when the running direction of the vehicle is substantially parallel to the edge of the elevated surface.

This disadvantage called "ridge effect" occurs both during movement of the vehicle between lanes of a highway which are at different levels, or when the vehicle must cross an elevated edge of the pavement as it moves from the highway shoulder to the paved surface.

This disadvantage is particularly apparent in radial tires because of the great difference in rigidity between the sidewalls or shoulders of the tire and the tire tread. In fact, while the tread portion of the tire is rather stiff, because it is supported by a breaker, the sidewalls are unsupported and are much more easily deformed. For this reason the tire tends to follow alongside an elevated paved edge because the softer shoulder of the tire is depressed and the more rigid tire tread is not. High dynamic actions are exerted on the tire, which is thence deflected from its steered course.

To eliminate this disadvantage, it has been proposed to provide pneumatic tires with sidewalls having projections which cooperate with the surfaces of steps or ridges in a roadway. However, such projections have not entirely solved the problem.

It is therefore an object of this invention to provide a radial pneumatic tire for vehicles such as motor vehicles which is devoid of the foregoing disadvantages. Another object of the invention is to provide a radial tire adapted to move with less difficulty across the edge between two surfaces of different elevation. Another object is to improve the performance of radial tires and particularly to provide a radial tire adapted to move over the edge between an unpaved surface or shoulder along a highway and a slightly elevated paved surface.

Other objects will become apparent from the following description with reference to the accompanying drawing wherein FIG. 1 is a diagrammatic, fragmentary perspective view of one embodiment of the invention;

The foregoing objects and others are accomplished in accordance with this invention, generally speaking, by providing a radial tire which has a carcass with sidewalls, a tread extending laterally across the carcass between the sidewalls and an annular breaker embedded between the tread and carcass with a conical surface which joins the tread and each sidewall and has an axis which is coincident with the axis of the tire.

Figure 1:
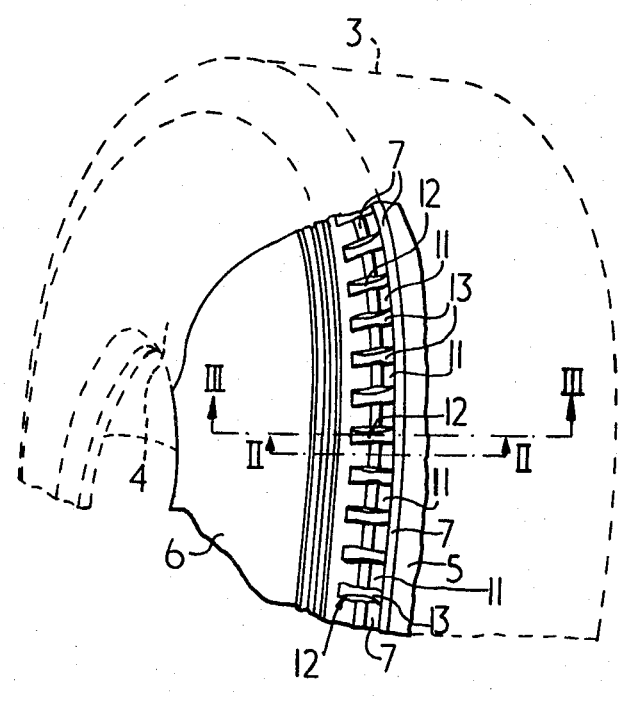
Figure 2:
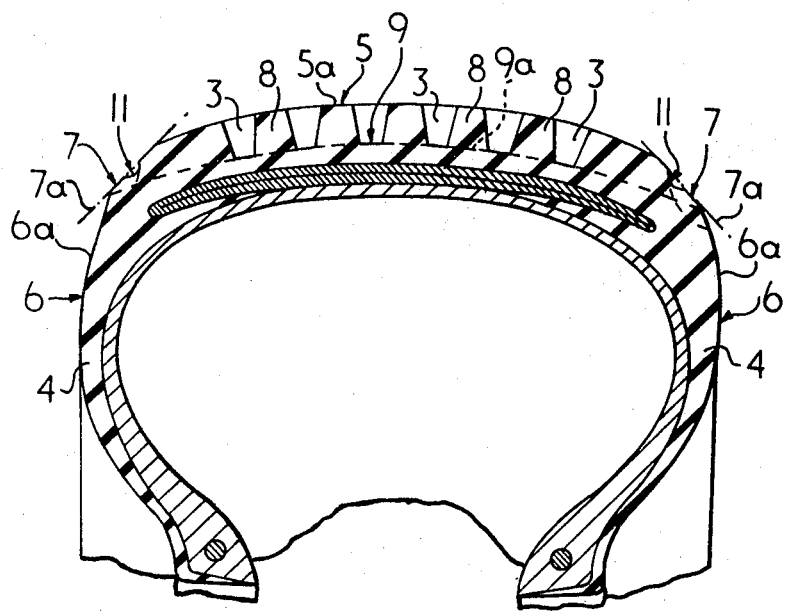
FIG. 2 is a section taken along the line II—II of FIG. 1.

Referring now to the drawing and particularly to FIGS. 1 and 2, the illustrated embodiment of a pneumatic tire has a carcass 1 of the radial type in which the cords of the single plies lie in planes passing through the axis of rotation of the tire. A stiffening structure or breaker 2 composed of one or more pair of plies or layers of cords is embedded between the curved wall of the carcass and a tread 3. A suitable conventional rubber compound is applied over the external surface of the carcass 1 and breaker 2 to form tread 3 and sidewalls 4.

The external surface of tread 3 and of sidewalls 4, respectively 5 and 6, are defined by the curved lines 5a and 6a on the plane of FIG. 2 (which is a plane passing through the axis of the tire). Precisely, line 5a is substantially concentric with the curvature of breaker 2 across its width. In this way, the thickness $h$ of tread 3 over breaker 2 is substantially uniform throughout the width of the breaker.

Figure 4:
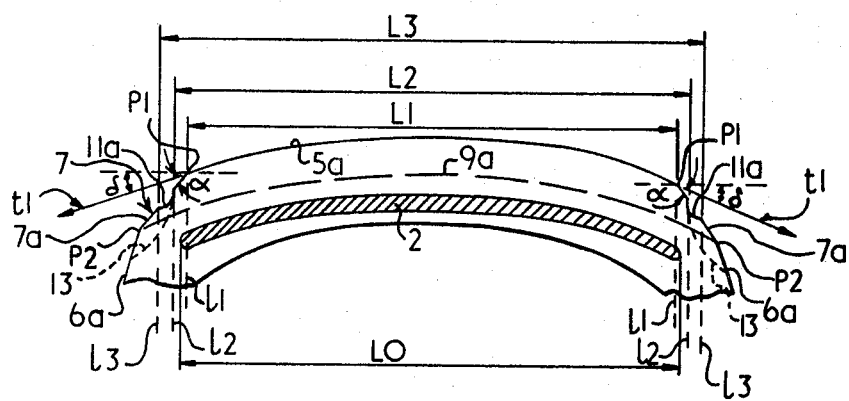
FIG. 4 illustrates diagrammatically the profile of the external surface of a cross-section of an embodiment of the tire provided by the invention.

In accordance with this invention, surface 5 of tread 3 and each surface 6 of sidewalls 4 are joined by means of a substantially conical surface 7 (FIGS. 1 and 2) which has an axis which coincides with the axis of the tire. The intersection of each surface 7 with a plane passing through the axis of the tire (plane of FIG. 2) originates segments 7a (FIG. 4). Segments 7a intersect the curved lines 5a and 6a as defined above at points $P_1$ and $P_2$, respectively, as shown in FIG. 4. Only the profile 5a of the external surface 5 of tread 3 is illustrated in FIG. 4 for the purpose of clarity.

Each conical surface 7 (FIG. 2) is selected in such a way that the angle $\alpha$ (FIG. 4) formed between tangent $t_1$ to curve 5a at point $P_1$ and the corresponding segment 7a (coincident with a generatrix of said conical surface) is between 15° and 50°.

The reasons which have led to this selection of the value of angle $\alpha$ in the above range will be more clearly apparent from the following discussion.

The tread 3 (FIG. 2) is provided with annular grooves 9 and spaced projections 8. Grooves 9 are of substantially the same depth and a line 9a drawn through the base of grooves 9 is concentric with the profile of tread 3 as represented by the dotted line 9a in FIGS. 2 and 4.

Each conical surface 7 (FIG. 2) intersects sidewall 4 at the point where groove 9 crosses the external surface 6 of sidewalls 4. In other words, curve 9a (FIG. 4) passes through points $P_2$.

Figure 3:
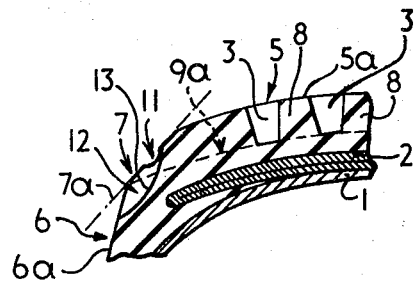
FIG. 3 is a fragmentary section taken along the line III—III of FIG. 1.
Figure 5:
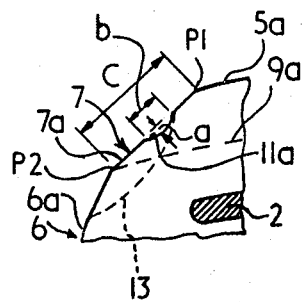
FIG. 5 illustrates an enlarged portion of the shoulder of the tire of FIG. 4.

Each surface 7 is provided with an annular groove 11 (FIGS. 1, 2 and 3), arranged substantially in the central part of the surface itself. The revolution surface which defines said groove, crossing a plane passing through the axis of the tire (plane of FIGS. 2 and 4), generates a curved line $11a$ (FIGS. 4 and 5), shaped for instance as an arc of circumference.

The dimensions of annular groove 11 are such that the ratio between its depth $a$ (FIG. 5), measured in a direction perpendicular to segment $7a$, and its width $b$, measured in a direction parallel to said segment, falls within a pre-established range. The value of the ratio $a/b$ is between 0.2 and 0.5. Also the ratio between width $b$ of the annular groove and length $c$ of the segment $7a$ (FIG. 5) falls within a pre-established range. The value of said ratio $b/c$ is between 0.3 and 0.6.

Each conical surface 7 is provided with a plurality of radial grooves 12 (FIGS. 1 and 3), each of which has a concave surface 13. Said grooves 12 are uniformly spaced circumferentially on each surface 7 and the axis of each of them is substantially contained in a plane passing through the axis of the tire.

The width of the breaker 2, indicated as $L_0$ in the diagrammatical representation of FIG. 4, is greater than the distance $L_1$ between the pair of parallels which define externally the upper surface 5 (FIG. 2) of tread 3 and whose path has been indicated with dotted line $1_1$ in FIG. 4.

Moreover, width $L_0$ is smaller than distance $L_3$ between the pair of parallels which define axially externally the annular grooves 11, and whose path has been indicated with $1_3$ in FIG. 4.

According to a preferred constructional arrangement, width $L_0$ of breaker 2 is greater than distance $L_1$ as defined above and smaller than distance $L_2$ between the pair of parallels which define axially internally said annular grooves, and whose path is indicated with $1_2$ in FIG. 4.

The tire provided by this invention behaves as follows when installed on a motor vehicle.

Figure 6:
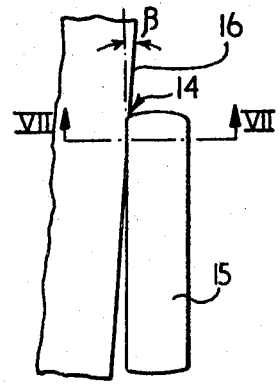
FIG. 6 is a diagrammatic illustration of an embodiment of the invention as it starts to cross the edge of the pavement from the shoulder of a highway.
Figure 7:
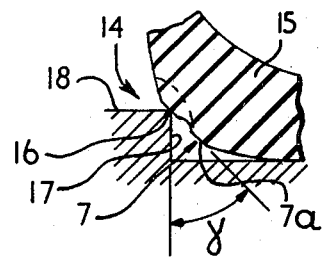
FIG. 7 is a fragmentary section of the tire shoulder taken along the line VII—VII of FIG. 6.
Figure 8:
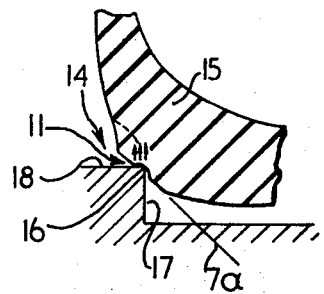
FIG. 8 illustrates in a fragmentary section that portion of the tire of FIG. 7 with the shoulder on the edge of the paved surface.

Let us assume that the vehicle equipped with the tires according to the invention is to move from one running lane of a highway to another one and that the level of the two is different so they are separated from each other by a step or elevated edge 14 (FIGS. 6, 7 and 8).

Moreover, let us assume that during this movement, the angle $\beta$ (FIG. 6) formed in the running direction of the tire 15 towards the edge 16 of step 14 is very small, for instance 5°. At the beginning of contact between tire 15 and edge 16, (FIG. 7), the latter takes place at one generatrix of the conical surface 7, which, at the time in which said contact takes place, forms with respect to the vertical face 17 of step 14 an angle $\gamma$. If $\delta$ is the value of the angle formed by tangents $t_1$ (FIG. 4) at point $P_1$ with the axis of the tire, the value of angle $\gamma$ is equal to:

$\gamma = (\pi/2) - (\alpha + \delta)$

Consequently, angle $\gamma$ depends on $\alpha$ and its value, with $\delta$ constant (namely at a curvature equal to that of the curved line $5a$ (FIG. 4)) is the higher the smaller the value of $\alpha$. From FIG. 7 it is evident that it is increasingly easier for tire 15 to move to step 14 as the value of $\gamma$ increases. It has been ascertained that, with difference values between the maximum width of the tire section and the useful width of the tread which are comprised in the range normally adopted in conventional tires and with commonly adopted $\delta$ values, if the value of angle $\alpha$ is comprised in the above indicated range, the conical surfaces 7 are able to allow an easy stepping up of the tire 15 on the step 14.

In the conventional tires heretofore known, in which the conical surfaces 7 are not provided, the contact between the step and the tire takes place between surface 17 (FIG. 7) of the step itself and the surface of the tire sidewall, which form very reduced angles between them. In these conditions it is difficult for the tire to step up to step 14 because of the high pressures which the surface of the step applies to the tire sidewall, and which tend to detach the latter from the former.

Also the annular grooves 11 (FIGS. 1, 2 and 3) facilitate in a remarkable way the stepping up of the tire on the step.

In fact, during said phase, the groove 11 (FIG. 8) even if it is deformed as shown in FIG. 8, constitutes a cavity into which edge 16 of the step is received. Between the deformed surface of the groove and the upper face of step 14 pressures substantially normal to said face (indicated with the vectors of FIG. 8) are transmitted, which obviously cooperate in supporting the tire during the stepping up phase.

This action, carried out by the annular grooves 11, is particularly relevant when the crossing of the step is effected at a small angle $\beta$ (FIG. 6), namely when the angle formed between the edge 16 of the step and the running direction of the vehicle is small.

Figure 9:
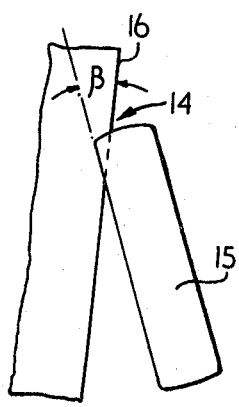
FIG. 9 is a diagrammatic illustration similar to FIG. 6 but after a portion of the tire is on the paved surface.
Figure 10:
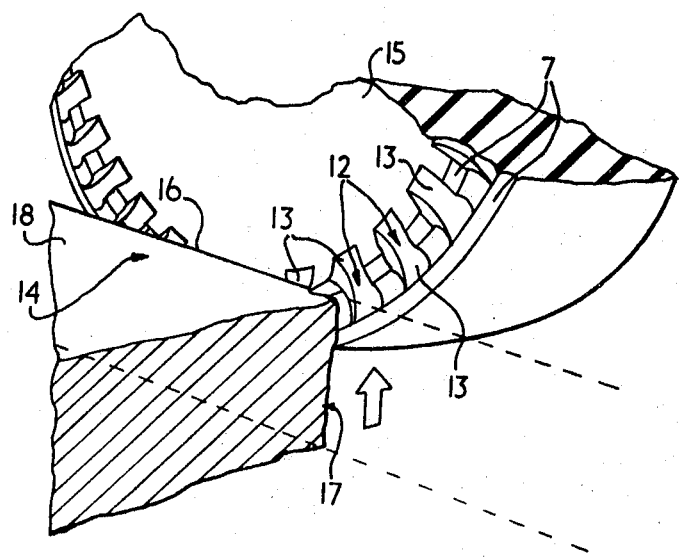
FIG. 10 is a perspective view of the lower part of an embodiment of the invention as it moves up to the paved surface to the position illustrated in FIG. 9.

An action analogous to that described above is exerted by the grooves 12 (FIGS. 1 and 3), which are also able to facilitate the stepping up of the tire on a step, in particular when the crossing of the step is effected at rather high $\beta$ angles, for instance angles greater than 5°, as it is diagrammatically represented in FIG. 9. In this case, because of the deformation of the surfaces 13 (FIG. 10) of grooves 12, the grooves 12 cooperate with the upper face 18 of the step and pressures substantially normal to the face are transmitted between the latter and the surfaces, which pressures are able to contribute to the support of the tire during its stepping up on the step.

The above described actions carried out by the conical surfaces 7, the annular grooves 11 and the grooves 12, are most pronounced if the width of the breaker 2 is within the range indicated hereinbefore.

If the width of breaker 2 is such that its ends are radially below a substantial portion of the conical surface 7, the deformability of the lateral parts of tread 3 (FIGS. 2 and 3) and of the parts of sidewalls external surfaces 6 adjacent to surfaces 7 is considerably reduced, and is substantially of the same order of magnitude as that existing at the central part of the tread. It follows that, during the stepping up of the tire on the step, in the zone of contact of the tire with the step, local deformation is not very high so that a correct contact between the conical surfaces 7 and the step is insured, and above all there are not sudden variations of rigidity when the contact between the tire and the step passes from a conical surface 7 to the surface 5 of tread 3.

As it is known, sudden variations of rigidity cause dynamic actions on the tire, which can cause unexpected deviation of the vehicle from its path.

Another favorable action exerted by the breaker 2, when its width $L_0$ is within the above indicated range of values, is that heating of the zones adjacent to the conical surfaces 7 during the normal running of the vehicle is reduced. In fact, if width $L_0$ of the breaker is rather high, the lateral parts of the breaker prevents an excessive deformation of the material forming the lateral parts of the tread 3 and of those parts of sidewalls 4 which are between the breaker itself and the conical surfaces 7.

To realize that the action carried out by breaker 2 is obtained only if its width $L_0$ is within the range of values indicated above, it is necessary to take into account that, if the value of $L_0$ is too low (smaller than the indicated one), the lateral parts of tread 3 are not sufficiently stiffened and, during the working of the tire, can therefore deform excessively, giving rise to a premature wear, while, if the value of $L_0$ is too high (greater than the indicated one), the tread can detach from the breaker because of the fatigue stresses to which the tire is subjected in use. In fact, for values of $L_0$ higher than those indicated, the resistance of the material which is between the edges of breaker 2 (FIGS. 2 and 3) and the surfaces 6 of the sidewalls is reduced considerably because of the small thickness of the material itself.

It is pointed out that both the annular grooves 11 and the grooves 12 cooperate in limiting the heating of the lateral parts of tread 3 between the conical surfaces 7 and breaker 2, since those grooves represent a wide surface through which a thermal exchange may take place between the material constituting said parts and its environment.

It follows that, by means of the described structure, it is also possible to reduce the wear of the tire at the lateral parts of tread 3.

Although the invention has been described in detail for the purpose of illustration, it is to be understood that such detail is solely for that purpose and that variations can be made by those skilled in the art without departing from the spirit and scope of the invention except as it may be limited by the claims.

The embodiments of the invention in which an exclusive property or privilege is claimed are defined as follows:

1. A radial tire for vehicles comprising:
    a carcass with sidewalls which have a curved external profile in cross-section;
    a tread between the sidewalls and having an external profile which is curved in cross-section;
    a breaker between the tread and the underlying carcass;
    at the point of intersection between each sidewall and the tread, a right circular conical surface of rotation having its axis coincident with the axis of the tire, said conical surface comprising a continuous annular band integral with the tread and having a surface which lies in a plane at an angle of from 15° to 50° with the tangent of the tread's profile;
    a plurality of circumferentially equally spaced radial grooves in said conical surface; and
    an annular groove coaxial with the axis of the tire in said conical surface;
    said breaker extending beyond the point of intersection of the conical surface with the tread but not beyond the point of intersection of said conical surface with said annular groove on that side of the groove which is axially nearer to the equatorial plane of the tire.

2. The tire of claim 1 wherein the width of the breaker is such that each of its ends extend as far as the point of intersection of said conical surfaces with said annular groove which is axially nearer to the equatorial plane of the tire.

3. The tire of claim 1 wherein the ratio of the width of the open end of the annular groove to the width of the conical surface is between 0.3 and 0.6.

4. The tire of claim 1 wherein the depth of the annular groove is 0.2 to 0.5 of the width of the open end of the groove.

5. The tire of claim 2 wherein each of said radial grooves terminates at one end at the said point of intersection and terminates at the opposite end of the said sidewall.

6. The tire of claim 1 wherein the tread has cavities therein and the depth of the cavities is such that a line concentric with the profile of the tread in cross-section passes through the point of intersection of the conical surface with the sidewalls.

* * * * *